United States Patent [19]

Kanai

[11] Patent Number: 5,105,272
[45] Date of Patent: Apr. 14, 1992

[54] SYNCHRONIZING SIGNAL EXTRACTING APPARATUS

[75] Inventor: Toshio Kanai, Takatsuki, Japan

[73] Assignee: Matsushita Electric Industrial Co., Ltd., Osaka, Japan

[21] Appl. No.: 474,102

[22] PCT Filed: Aug. 29, 1989

[86] PCT No.: PCT/JP89/00876
§ 371 Date: Apr. 20, 1990
§ 102(e) Date: Apr. 20, 1990

[87] PCT Pub. No.: WO90/02463
PCT Pub. Date: Mar. 8, 1990

[30] Foreign Application Priority Data

Aug. 31, 1988 [JP] Japan .................. 63-216610

[51] Int. Cl.$^5$ .................................. H04N 5/08
[52] U.S. Cl. .......................................... 358/153
[58] Field of Search ................. 358/148, 153, 154

[56] References Cited

U.S. PATENT DOCUMENTS

| | | | |
|---|---|---|---|
| 3,706,847 | 12/1972 | Smeulers | 358/153 |
| 3,819,859 | 6/1974 | Borsuk et al. | 358/154 |
| 4,081,833 | 3/1978 | Akiyoma | 358/153 |
| 4,084,187 | 4/1978 | Schlotehauer et al. | 358/153 |
| 4,942,469 | 7/1990 | Kanai | 358/153 |

FOREIGN PATENT DOCUMENTS

| | | | |
|---|---|---|---|
| 0057950 | 5/1981 | Japan | 358/153 |
| 60-37983 | 3/1985 | Japan . | |
| 60-163577 | 8/1985 | Japan . | |
| 0010366 | 1/1986 | Japan | 358/153 |

Primary Examiner—James J. Groody
Assistant Examiner—David E. Harvey
Attorney, Agent, or Firm—Wenderoth, Lind & Ponack

[57] ABSTRACT

A synchronizing extracting apparatus is for extracting a synchronizing reference signal suitable for a digital signal processing circuit from an input composite picture signal which includes a ternary synchronizing signal. The negative peak of the input composite picture signal is clamped by a peak calming circuit, and the clamping output is applied to a pulse generating circuit to generate a first pulse having a pulse width extending from the front porch to of the synchronizing signal. The back porch, the input composite picture signal and a signal which is reverse in phase to the input composite picture signal are clamped by a pedestal clamping circuit. The output of the clamping circuit and the first pulse are respectively applied to two differential amplifying circuits. Two pulse signals of a same polarity corresponding to the negative polarity portion and the positive polarity portion of the ternary synchronizing signal of the input composite synchronizing signal are obtained. The synchronizing reference signal is obtained corresponding to the center of the one pair of pulse signals.

8 Claims, 5 Drawing Sheets input and output of current amplifying circuit 101 output of peak clamping circuit 102 output of voltage comparing circuit 103 output of voltage comparing circuit 103 input and output of current amplifying circuit 1 output of voltage amplifying circuit 2 output of peak clamping circuit 3 first pulse second pulse

FIG. 4(f) first output of pedestal clamping circuit 6
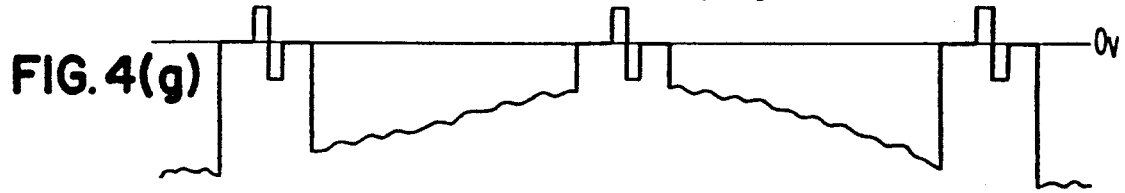
FIG. 4(g) second output of pedestal clamping circuit 6
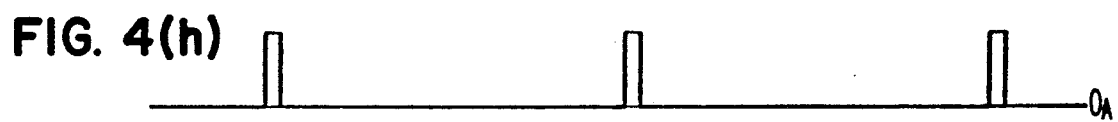
FIG. 4(h) output current of first differential amplifying circuit 7
FIG. 4(i) output current of second differential amplifying circuit 8
FIG. 4(j) output current of the present apparatus

5,105,272

SYNCHRONIZING SIGNAL EXTRACTING APPARATUS

BACKGROUND OF THE INVENTION

The present invention relates to a synchronizing signal extracting apparatus for a display device for projecting high quality television pictures.

In the conventional NTSC system television signals, the horizontal synchronizing signal is a negative polarity pulse inserted on the black level side of the picture signal. On the other hand, studio standards of a high quality television system prescribe that the horizontal synchronizing signal is take the form of the so-called ternary value synchronizing signal which comprises two pulses of a negative and positive polarity. The present invention relates to a synchronizing signal detaching apparatus which is capable of correctly reproducing the ternary value synchronizing signals.

FIG. 1 is a block diagram of the conventional synchronizing signal extracting apparatus. In FIG. 1, reference denotes 101 a current amplifying circuit for amplifying composite signals including a ternary value synchronizing signal and a picture signal, 102 denotes a peak clamping circuit for securing the negative peak of the output of the current amplifying circuit 101 to a constant direct current level, and 103 denotes a voltage comparing circuit for outputting a prescribed voltage when the output of the peak clamping circuit 102 is lower than a reference value.

By the above-described construction, positive polarity synchronizing signals are obtained in the output of the voltage comparing circuit 103. FIGS. 2(a)–(d) depict voltage waveforms of each portion of the conventional synchronizing signal extracting apparatus. The operation of the conventional synchronizing signal extracting apparatus of FIG. 1 will be described below with reference to FIG. 2.

The composite signal a of FIG. 2(a) is amplified in the current amplifying circuit 101 and is inputted to the peak clamping circuit 102. As the negative peak of the ternary value synchronizing signal is clamped to 0 V, the output of the peak clamping circuit 102 is provided as shown in FIG. 2(b). When the signal "b" is inputted into the voltage comparing circuit 103, this electric potential of the signal is compared with a voltage comparison reference potential for and the comparison result is output as shown in FIG. 2(c). As shown in FIG. 2, although the signal "c" contains the so-called pedestal portion, the level of the pedestal may be made have a potential of zero if the reference potential of the voltage comparison is adjusted each time, so that the output of the voltage comparing circuit 103 includes only the positive polarity pulses as shown in FIG. 2(d). A point at which each output pulse in FIG. 2(d) drops to the 0 potential is used as the synchronizing reference of the high quality television receiver image receiving device.

In, the synchronizing signal extracting apparatus of the conventional embodiment, it is necessary to adjust the comparative reference potential of the voltage comparing circuit to obtain the synchronizing reference of the high quality television image receiving device. Accordingly, if a variation of the reference potential and an output variation of the peak clamping circuit are present, the width of the output pulse becomes narrower when the waveform of the input synchronizing signal losses its sharpness due to the capacitive component of the signal transmission path, with a disadvantage resulting in that the pedestal portion is contained in the output as shown in FIG. 2(c) to prevent the synchronizing reference from being reproduced.

SUMMARY OF THE INVENTION

A main object of the present invention is to provide a synchronizing signal extracting circuit which is capable of correctly reproducing the synchronizing reference in the ternary value synchronizing signal.

In order to achieve the above-described object, the synchronizing signal extracting apparatus of the present invention includes a circuit for obtaining two composite picture signals having mutually reversed phases from the input composite picture signal, a pedestal clamping circuit for equalling the pedestal level of the two composite picture signals, two differential amplifying circuits upon which the two pedestal-clamped signals are applied, a pulse generating circuit for generating a pulse signal having a pulse width extending from a front porch to a back porch in accordance with the input composite picture signal, wherein the pulse generating circuit outputs are inputted respectively into the other terminals of the differential amplifying circuit to compose the output of the differential amplifying circuits so as to obtain the synchronizing reference.

By the above-described construction, the two pulses of negative and positive polarity of the ternary value synchronizing signal are obtained in the output of the differential amplifying circuit as a pair of pulses of the same polarity, and may be extracted in a form which is easier to handle as a digital signal from the composite signal. If the center of a pair of pulses which are the outputs of the differential amplifying circuit is prescribed to be a synchronized reference, the adjustment of the comparative reference potential as in the conventional embodiment becomes unnecessary, so that a superior synchronizing signal extracting apparatus is provided in which the synchronizing reference does not vary even if the clamp level varies.

BRIEF DESCRIPTION OF THE DRAWINGS

FIGS. 4(a)–(j) depict wave-forms for illustrating the operation of the synchronizing signal extracting apparatus shown in FIG. 3.

DESCRIPTION OF THE PREFERRED EMBODIMENT

Figure 3:
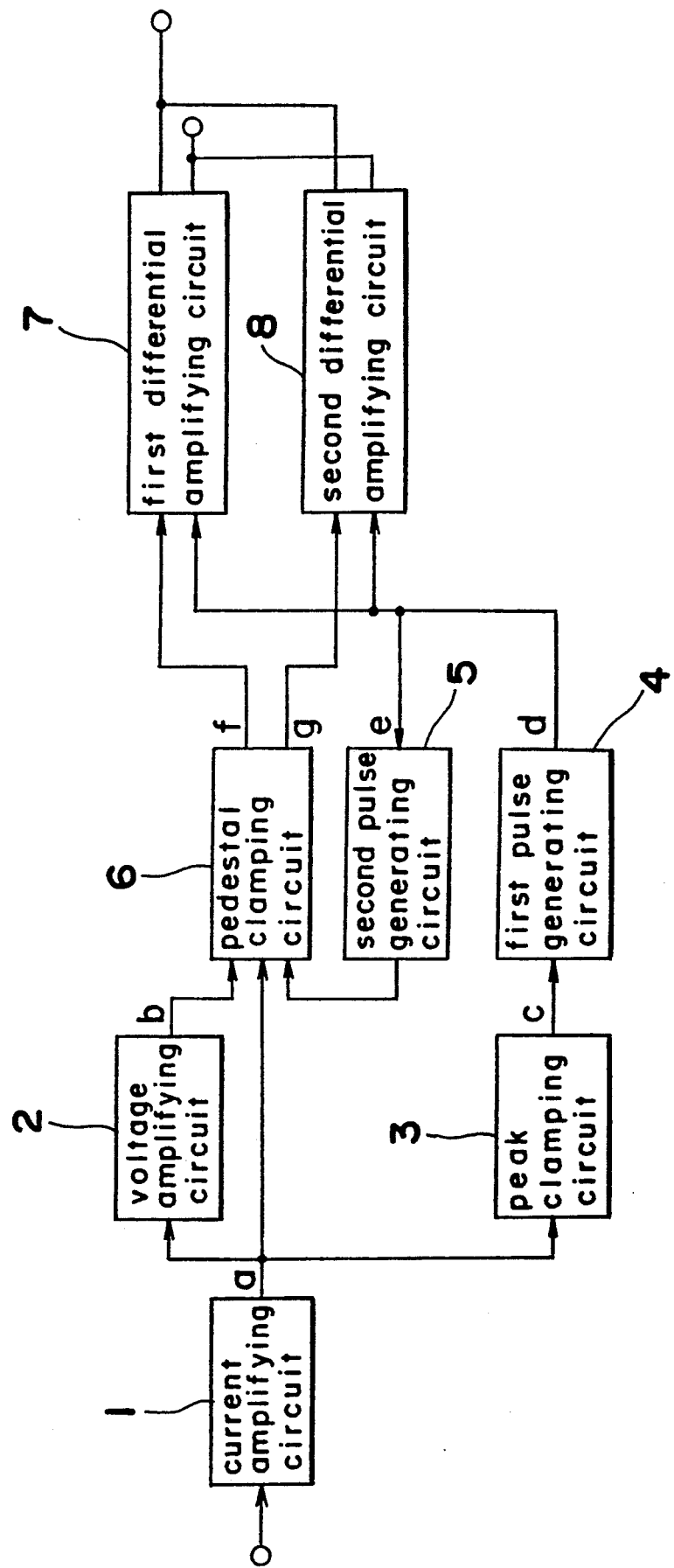
FIG. 3 is a block diagram of a synchronizing signal extracting apparatus in one embodiment of the present invention.

FIG. 3 is a block diagram of a synchronizing signal extracting apparatus in one embodiment of the present invention, FIGS. 4(a)–(j) depict the voltage waveforms of each portion in the synchronizing signal extracting apparatus in the one embodiment. The embodiment of the present invention will be described hereinafter with reference to the drawings.

In FIG. 3, reference 1 denotes a current amplifying circuit for amplifying the input composite picture signal containing the ternary value synchronizing signal, reference 2 denotes a voltage amplifying circuit of gain 1 for reversing the output of the current amplifying circuit 1, reference 3 denotes a peak clamping circuit for clamping the negative peak of the output of the current amplifying circuit 1 to a constant direct current voltage level.

Also, reference 4 denotes a first pulse generating circuit which is triggered with the negative peak of the output of the peak clamping circuit 3 to generate a first pulse having a pulse width extending from the front porch appearing before, after of the ternary value synchronizing signal to the back porch appearing after the ternary value synchronizing signal, reference 5 denotes a second pulse generating circuit which is triggered with the output of the first pulse generating circuit 4 to generate a second pulse of a prescribed pulse width, reference 6 denotes a pedestal clamping circuit which uses the output of the second pulse generating circuit 5 as a gate voltage, and which includes inputs the output of the current amplifying circuit 1 and the output of the voltage amplifying circuit 2 so as to equalize the pedestal potentials. Reference 7 denotes a first differential amplifying circuit upon which the first output of the pedestal clamping circuit 6 and the first pulse output from the first pulse generating circuit 4 are applied. Reference 8 denotes a second differential amplifying circuit upon which the second output of the pedestal clamping circuit 6 and the first pulse are applied.

The operation of each portion in the apparatus constructed as described hereinabove will be described with reference to FIG. 3, and FIGS. 4(a)-(j)

Figure 4A:
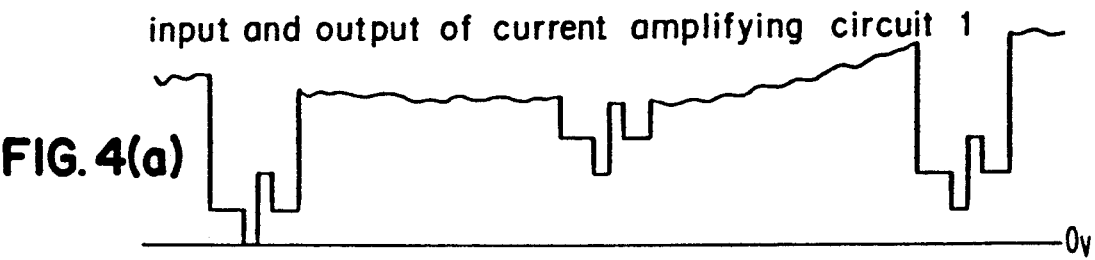
Figure 4B:
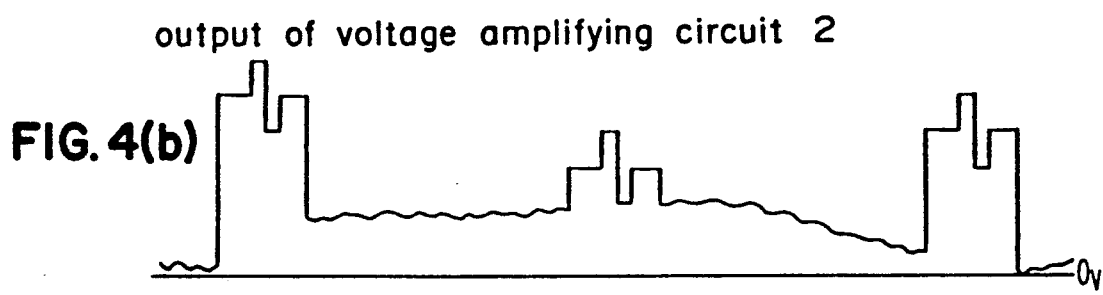

The input and the output of the current amplifying circuit 1 has a voltage wave-form as shown in FIG. 4(a). The output of the voltage amplifying circuit 2 for reversing the output of the current amplifying circuit 1 has a voltage waveform as shown in FIG. 4(b). The output of the peak clamping circuit 3 upon which the output "a" of the current amplifying circuit 1 is amplified becomes a voltage waveform as shown in FIG. 4(c) with the negative peak being maintained at the constant potential, which is 0 V in the present embodiment.

Figure 4C:
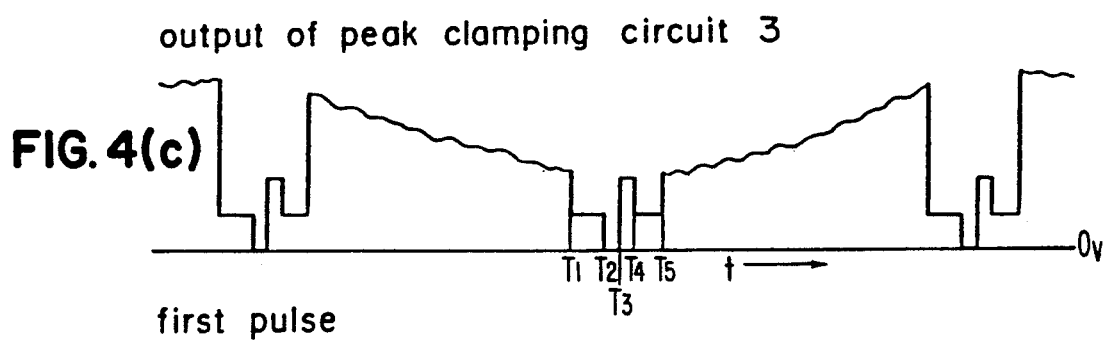

As shown in FIG. 4(c), the signal portion at $T1 \leq t \leq T2$ before the ternary value synchronizing signal is referred to as a front porch, the signal portion at $T2 \leq t \leq T3$ is the polarity pulse of the synchronizing signal, the signal portion at $T3 \leq t \leq T4$ is the positive polarity pulse of the synchronizing signal, and the signal portion at $T4 \leq t \leq T5$ is referred to as a back porch. The signal at $T1 \leq t \leq T5$ constitutes a pedestal period with the ternary value synchronizing signal being piled up with the pedestal level as the reference.

The so-called pedestal clamping effected in the pedestal clamping circuit 6 is for maintaining a constant potential of the pedestal as in peak clamping. It is to be noted that there are a back porch clamping system and a front porch clamping system as the specific methods thereof.

Figure 1:
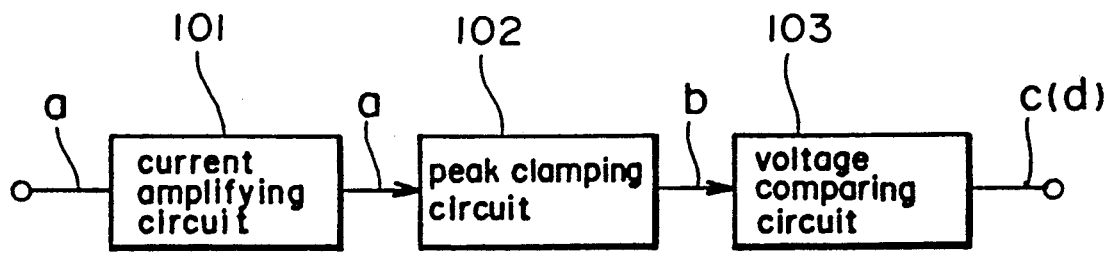
FIG. 1 is a block diagram of a synchronizing signal extracting apparatus of the conventional embodiment.
Figure 2A:
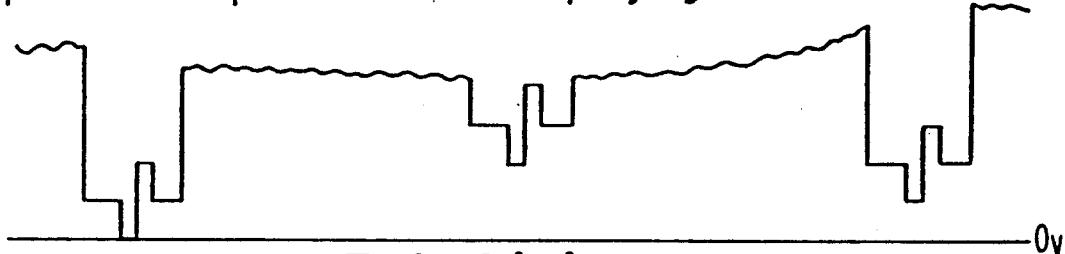
FIGS. 2(a)–(d) depict wave-forms for illustrating the operation of the synchronizing signal extracting apparatus of the conventional embodiment.
Figure 2B:
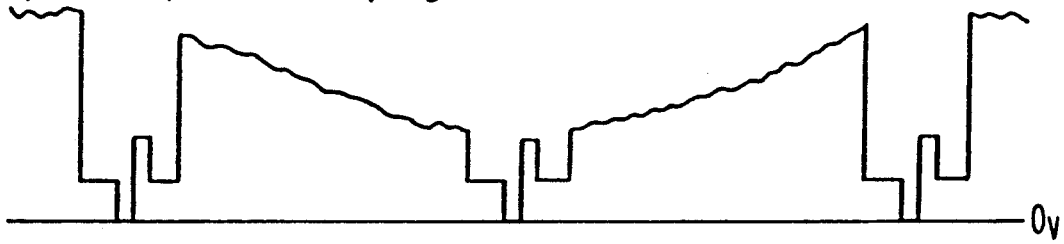
Figure 2C:
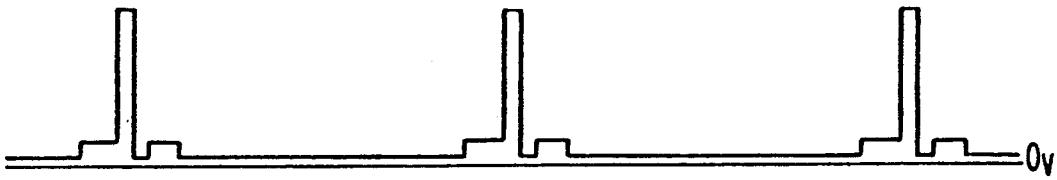
Figure 2D:
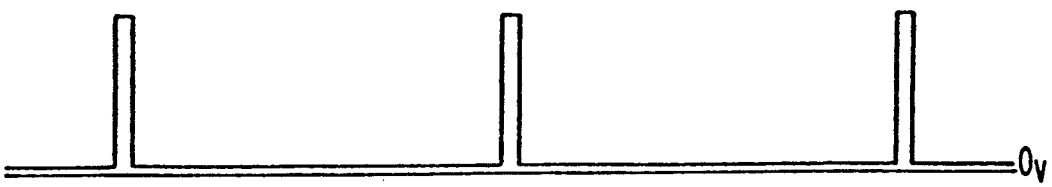
Figure 4D:
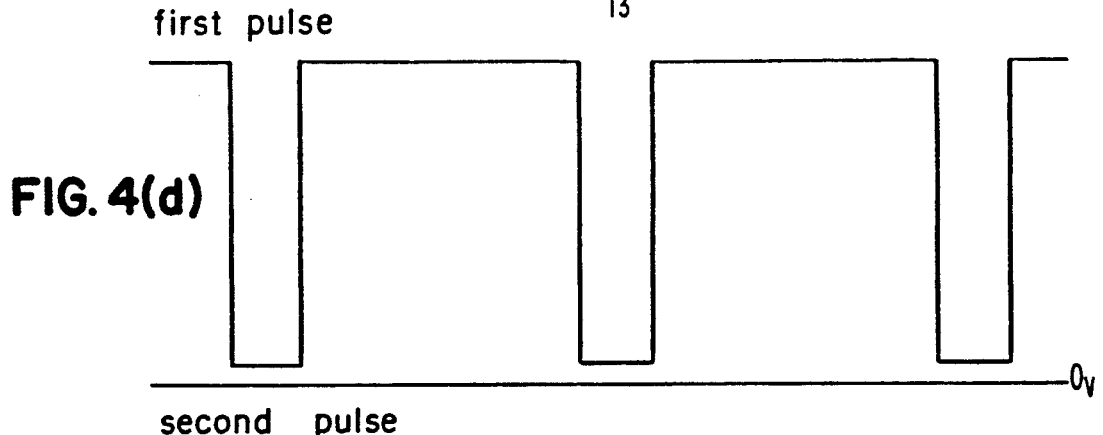
Figure 4E:
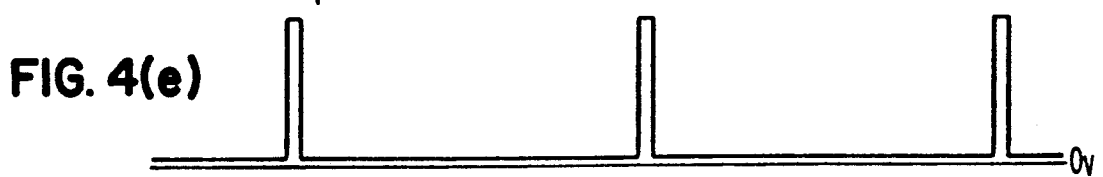

The first pulse generating circuit 4 is triggered with the peak clamping output shown in FIG. 4(c) to generate the first pulse "d" (FIG. 4(d) of a negative polarity extending from the back porch, to the front porch. The second pulse generating circuit 5 is triggered by the first pulse "d" to generate a second pulse "e" of a positive polarity having the constant pulse width as shown in FIG. 4(e). The generating timing of the second pulse "e" is a back porch period. Since the pedestal clamping circuit 6 gates the output "a" of the current amplifying circuit 1 and the output "b" of the voltage amplifying circuit 2 according to the pulse period of the second pulse (FIG. 2(e) to clamp the back porch to the 0 potential to effect the outputting operation, the outputs of the pedestal clamping circuit become the first, second outputs f, and g having voltage waveforms shown respectively in FIGS. 4(f), 4(g).

Figure 5:
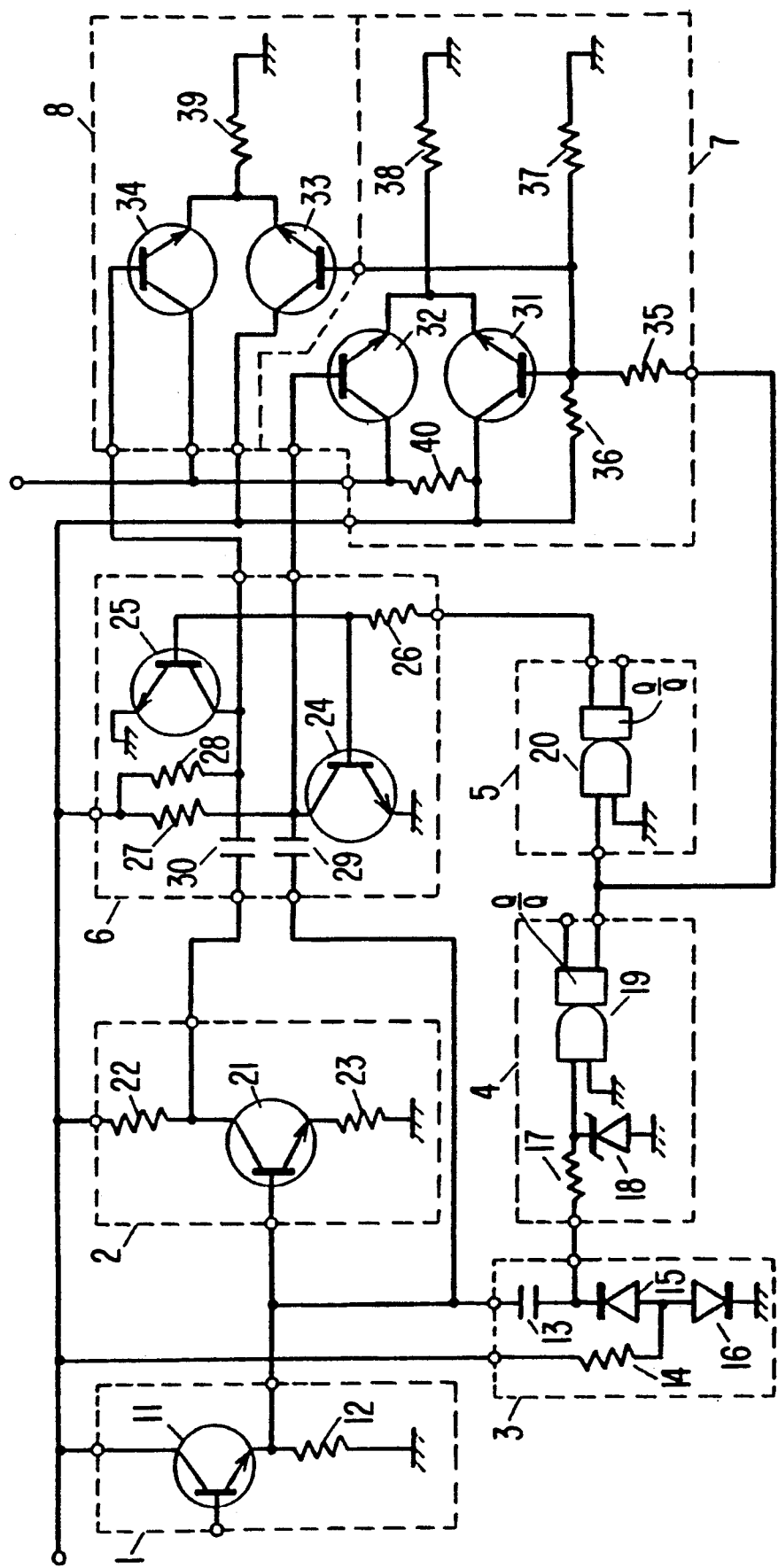
FIG. 5 is a circuit diagram of a synchronizing signal extracting apparatus in one embodiment of the present invention.

A specific circuit diagram of the synchronizing signal extracting apparatus of the present embodiment of FIG. 3 is shown in FIG. 5.

In FIG. 5, reference 1 denotes a current amplifying circuit for amplifying the composite signal containing the ternary synchronizing signal, reference 11 denotes a transistor for amplifying the current, and reference 12 is denotes a load resistor. Reference 2 denotes a voltage amplifying circuit of gain 1 for reversing the output of the current amplifying circuit 1, reference 21 denotes a second transistor, reference 22 denotes a second resistor which is a load, reference 23 denotes a third resistor having a resistance value which is the same as that of the resistor 22.

Reference 3 denotes a peak clamping circuit for clamping the negative peak of the output of the current amplifying circuit 1 to 0 V, reference 13 denotes a capacitor for removing the direct current of the input, reference 14 denotes a resistor for feeding the current into the capacitor 13 from the power supply, reference 15 denotes a diode for applying the charging current to the capacitor 13 and for preventing an electric charge, reference 16 denotes a second diode connected to the nodes of the resistor 14 and the diode 15 to maintain the anode voltage of the diode 15 constant. Since each cathode voltage is equal if the diode 15 and the diode 16 have the same characteristics, the cathode voltage of the first diode 15, which is the output voltage of the peak clamping circuit 3, does not become 0 V or less, whereby the negative peak of the output voltage thus becomes 0 V.

Reference 4 denotes a circuit triggered by the negative peak of the output of the peak clamping circuit 3 to generate the first pulse, reference 17 denotes a resistor for restricting the input current, reference 18 denotes a Zener diode which prevents over-input-voltage, reference 19 denotes a multivibrator which generates pulses when the input voltage becomes a reference voltage or less. Reference 5 denotes a second pulse generating circuit 5 which is triggered by the output of the first pulse generating circuit 4 to generate the second pulse, the multivibrator 20 generates second pulses when the input voltage becomes the reference voltage or more. Reference 6 denotes a pedestal clamping circuit which clamps the output of the current amplifying circuit 1 and the output of the voltage amplifying circuit 2 using the output of the second pulse generating circuit 5 as the gate voltage, references 24 and 25 denote third and fourth transistors, reference denotes 26 a current restricting resistor reference 27 and 28 denote resistors for feeding current to the transistors 24 and 25 from the power supply, references 29 and 30 denote capacitors for removing the direct current portion of the input voltage. When the second pulse is inputted into the bases of the transistors 24 and 25 through the resistor 26 and the transistors 24, 25 become conductive, thus grounding and charging, the capacitors 29 and 30. Since the pulse is repeatedly input, the electric charge of the capacitors is not discharged, the result being that two output voltages are clamped to become 0 V during the pulse period. Since the second pulse exists during the pedestal period of the signal, the circuit 6 is called a pedestal clamping circuit. References 7 and 8 denote two sets of differential amplifying circuits for receiving as inputs the first pulse and the two outputs of the pedestal clamping circuit 6,. References 31, 32, 33 and 34 denotes transistors for effecting differential amplification by a set of two, reference 35 denotes a resistor for restricting the input references 36 and 37 denote resistors for dividing the power supply voltage to provide a bias to the bases of the transistors 31 and 33, references 38 and 39 denote current feedback, resistors and reference 40 denotes a common load resistor of the transistors 32 and 34.

As shown in FIG. 5, the first differential amplifying circuit 7 is composed of two transistors 31 and 32 and a resistor. The first clamping output shown in FIG. 4(f) is applied to the base of the transistor 32, and the first pulse shown in FIG. 4(d) is applied to the base of the other transistor 31. Assuming that the peak value of the pulse "d" is sufficiently large, the transistor 32 is cut off when the pulse "d" is at a high potential, and the transistor 31 is conductive. The transistor 32 is conductive at a period when the potential of the positive polarity synchronizing signal exceeds the pulse "d" potential, and the output current of the differential amplifying circuit 7 is provided as shown in FIG. 4(h). The operation of the differential amplifying circuit 8 is similar to that of the differential amplifying circuit 7, and the output current shown in FIG. 4(i) is obtained from the input voltage signals of the FIGS. 4d and 4g.

The outputs of two differential amplifying circuits 7 and 8 are commonly connected to obtain the sum of the currents shown in FIGS. 4(h) and 4(i), whereby so that the output pulse shown in FIG. 4(j) is obtained. The output pulse becomes one continuous pulse if the synchronizing signal in the input composite signals is a completely rectangular wave. However, if the synchronizing signal has lost its sharpness and is actually closer in form to a sine wave when applied to the current amplifying circuit 1, a spacing between the pulses h and i becomes can result. The amount of spacing varies due to the variation in the input pulse of the differential amplifying circuit and the operation point. However, according to the operation of the above-described apparatus, it is clear that the pulse of the output exhibits a symmetrical waveform with respect to the center thereof, relative the time axis, so that the time center does not vary even if the spacing varies. It is possible to fill the spacing by the signal processing to provide one pulse, or it is possible to generate a pulse only during the period of the spacing. By the way, in the synchronizing AFC circuit of present television image receiving devices, a balance form of saw tooth wave AFC circuit is adopted, and the synchronizing signal and the comparison signal (saw tooth signal) are compared with in phase to apply the AFC. Thus, as described hereinabove, if the pulse j" of the total of two output pulses h and i has a symmetrical waveform at the time axis, it may be used as is as the synchronizing signal in the synchronizing circuit.

It is to be noted that, operationally, the two differential amplifying circuits are simply gate circuits driven by the first pulse Accordingly, by providing a device in which third transistor is adopted as a constant current supply in the differential amplifying circuit, a composite signal is inputted into the first transistor, a fixed bias is inputted into the second transistor, and a pulse for effecting the driving operation for the pulse period only is inputted into the third transistor, the same operation as in one embodiment may be effected.

As described hereinabove, two composite picture signals reverse mutually in phase in polarity from the input composite picture signal containing the ternary synchronizing signal may be obtained, the pedestal level of the two composite picture signals is made equal, two signals equal in these pedestal level are gated by the pulse of the pulse width spread from the front porch to the back porch, the same polarity of pulse corresponding to the positive polarity, negative polarity synchronizing signal sound component of the ternary synchronizing signal may be obtained, the synchronizing reference of the ternary synchronizing signal may be obtained by the composite pulse of these two pulses, so that the ternary synchronizing signal is changed in a form easy to handle and may be taken out. As a result, a synchronizing signal extracting apparatus of an extremely superior high-vision television signal which does not go wrong in the information of the synchronizing signal due to the dispersion of the circuit constant may be provided.

What is claimed is:

1. A synchronizing signal extracting apparatus comprising:
   receiving means for receiving an input composite picture signal;
   a peak clamping circuit, operatively coupled to said receiving means, for clamping a peak of the input composite picture signal, the input composite picture signal including a ternary value synchronizing signal, the ternary value synchronizing signal including a front porch portion, a negative polarity extending portion, a positive polarity extending portion and a back porch portion;
   a pulse generating circuit, operatively coupled to said peak clamping circuit, for generating a first pulse signal having a pulse width extending to the back porch portion from the front porch portion of the ternary value synchronizing signal;
   a reversing circuit, operatively coupled to said receiving means, for reversing the input composite picture signal;
   a pedestal clamping circuit, operatively coupled to said receiving means and said reversing circuit, for pedestal-clamping the input composite picture signal and the reversed input composite picture signal which are mutually reverse in phase;
   a first differential amplifying circuit, operatively coupled to said pedestal clamping circuit and said pulse generating circuit, for generating a second pulse signal corresponding to one of the positive polarity extending portion or the negative polarity extending portion of the ternary value synchronizing signal based on the pedestal-clamped input composite picture signal and the first pulse signal;
   a second differential amplifying circuit, operatively coupled to said pedestal clamping circuit and said pulse generating circuit, for generating a third pulse signal corresponding to the other of the positive polarity extending portion or the negative polarity extending portion of the ternary value synchronizing signal based on the pedestal-clamped reversed input composite picture signal and the first pulse signal;
   wherein the second and third pulse signals together correspond to an extracted synchronizing signal.

2. A synchronizing signal extracting apparatus as recited in claim 1, further comprising a second pulse generating circuit, operatively coupled to said pulse generating circuit, for generating a fourth pulse signal of a prescribed pulse width during the back porch portion of the ternary value synchronizing signal in accordance with the first pulse signal, wherein the fourth pulse signal is applied to said pedestal clamping circuit as a gate signal.

3. A synchronizing signal extracting apparatus as recited in claim 1, wherein the second and third pulse signals are of a same prescribed polarity.

4. A synchronizing signal extracting apparatus as recited in claim 2, wherein the second and third pulse signals are of a same prescribed polarity.

5. A synchronizing signal extracting apparatus as recited in claim 1, wherein a synchronizing reference of the extracted synchronizing signal corresponds to a center timing of the second and third pulse signals.

6. A synchronizing signal extracting apparatus as recited in claim 2, wherein a synchronizing reference of the extracted synchronizing signal corresponds to a center timing of the second and third pulse signals.

7. A synchronizing signal extracting apparatus as recited in claim 3, wherein synchronizing reference of the extracted synchronizing signal corresponds to a center timing of the second and third pulse signals.

8. A synchronizing signal extracting apparatus as recited in claim 4, wherein a synchronizing reference of the extracted synchronizing signal corresponds to a center timing of the second and third pulse signals.

* * * * *